US005152541A

United States Patent [19]

Baumgärtner et al.

[11] Patent Number: 5,152,541

[45] Date of Patent: Oct. 6, 1992

[54] CHUCK

[76] Inventors: Peter Baumgärtner, Frühlingstrasse 26, D-7322 Donzdorf/Winzingen, dorf/Winzingen; Karl Wieland, Marrenstrasse 9, D-7322 Donzdorf, both of Fed. Rep. of Germany

[21] Appl. No.: 774,082

[22] Filed: Oct. 9, 1991

[30] Foreign Application Priority Data

Oct. 15, 1990 [DE] Fed. Rep. of Germany ....... 4032694

[51] Int. Cl.[5] .............................................. B23B 31/02

[52] U.S. Cl. .................................. 279/8; 408/239 R; 409/234; 279/20

[58] Field of Search ............. 408/239 R, 233; 279/61, 279/76, 79, 80, 85–87, 8, 97, 89, 93, 75, 20; 403/16, 370, 362, 320; 409/234

[56] References Cited

U.S. PATENT DOCUMENTS

| | | | |
|---|---|---|---|
| 1,455,480 | 5/1923 | Dlesk | 408/239 |
| 1,457,994 | 6/1923 | Nedland | 279/8 X |
| 1,897,228 | 2/1933 | Beckett | 279/8 X |
| 2,470,218 | 5/1949 | McNamara | 279/20 |
| 2,667,357 | 1/1954 | Andreasson | 279/86 |
| 2,714,515 | 8/1955 | Faso | 279/89 |
| 3,195,909 | 7/1965 | Winnen | 279/76 |
| 3,202,433 | 8/1965 | Davis | 403/362 X |
| 3,618,962 | 11/1971 | Cox | 279/97 |
| 4,076,443 | 2/1978 | Halpern | 408/239 R X |
| 4,571,132 | 2/1986 | Bunge | 279/82 X |
| 4,899,644 | 2/1990 | Susnjara | 279/79 X |
| 4,971,491 | 11/1990 | Cook | 409/234 X |

FOREIGN PATENT DOCUMENTS

| | | | |
|---|---|---|---|
| 846950 | 9/1952 | Fed. Rep. of Germany | 279/97 |
| 688527 | 3/1953 | United Kingdom | 279/97 |
| 87/06313 | 10/1987 | World Int. Prop. O. | 279/79 |

*Primary Examiner*—Larry I. Schwartz
*Assistant Examiner*—R. Schultz
*Attorney, Agent, or Firm*—Anderson Kill Olick & Oshinsky

[57] ABSTRACT

A chuck for chucking predominantly chip-removing tools, such as milling cutters, drills, countersinks or the like which have a cylindrical shaft and a recessed drive surface on the shaft with stop shoulders in axial direction. A stop member inserted in a duct of the front portion of the chuck engages the stop surface, so that the chucking force acting on the tool shaft extends in axial direction and the chucking force is transmitted between the tool shaft and the front portion of the chuck by the locking member.

6 Claims, 1 Drawing Sheet

1
d
3c
1c
2
1b
3b
1c
3a
L
1d
P
3
5
4a
4
4b
D d
1a
3c
1b
1c
2a
3a
L
2a'
3b
1c
5
1d
3
6
4a
4
4b
D

CHUCK

BACKGROUND OF THE INVENTION

1. Field of the Invention

The present invention relates to a chuck for chucking predominantly chip-removing tools such as milling cutters, drills, countersinks and the like which have a cylindrical shaft and, in accordance with appropriate standards, at least one drive surface or recess on the shaft. The drive surface or recess defines stop shoulders in axial direction.

2. Description of the Related Art

Because of the arrangement of the radial chucking elements at a head portion or free end of the chuck, the collect chucks or the so-called sleeve chucks which have been used in the past for these types of tools and which have a clamping screw which acts radially on the tool shaft have a relatively large diameter, so that it is in many cases difficult or even impossible to reach certain locations of workpieces to be worked on.

SUMMARY OF THE INVENTION

Therefore, it is the object of the present invention to provide a novel chuck for commercially available tools of the types described above, wherein the chuck can have any chosen length at its free end which surrounds the tool shaft and the diameter can be kept extremely small.

In accordance with the present invention, a chuck is provided in which the chucking force acting on the tool shaft extends essentially in axial direction and the chucking force is transmitted through a locking member between the tool shaft and the front portion of the chuck.

The chuck according to the present invention has the advantage that the front portion of the chuck is free of radially acting chucking elements and, therefore, the chuck can have such a small diameter or wall thickness which provides sufficient material strength for absorbing the work forces acting on the tool.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figures 1, 2:
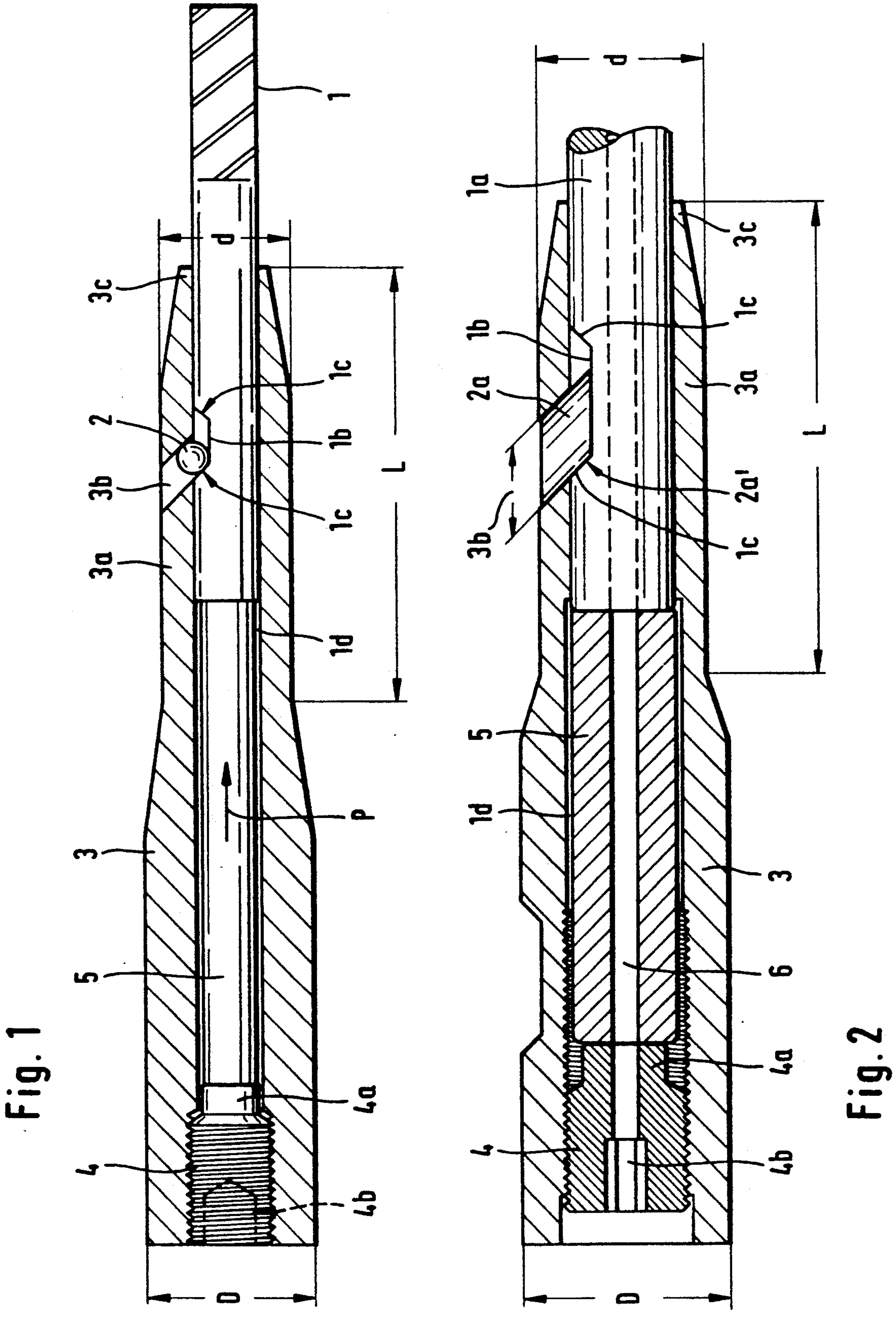
FIG. 1 is a longitudinal sectional view of a chuck according to the present invention.
FIG. 2 is a longitudinal sectional view of another embodiment of the chuck according to the present invention.

The chuck 3, 3*a* illustrated in the drawing is used for chucking predominantly chip-removing tools 1, such as milling cutters, drills, countersinks and the like which have a cylindrical shaft la and a drive surface 1*b* which is arranged recessed on the shaft 1*a*. The recessed drive surface 1*b* has stop shoulders 1*c* or the like in axial direction.

Thus, as mentioned above, the chuck according to the present invention provides the advantage over the prior art chucks that the chucking force P acting on the tool shaft 1*a* extends in axial direction and is transmitted by a locking member 2 or 2*a* between tool shaft 1*a* and front portion 3*a* of the chuck.

In a specific embodiment of the present invention, the chuck includes an elongated sleeve 3, 3*a* with concentrically arranged longitudinal bore 1*d*, a clamping screw 4 inserted in an end of the sleeve 3, 3*a* and a duct 3*b* in the front portion 3*a* of the chuck which is accessible from the outside and serves for insertion of the locking member 2 or 2*a*.

In accordance with an advantageous feature of the invention, the duct 3*b* in the front portion 3*a* of the chuck which receives the locking member 2 or 2*a* extends from the outer surface of the front portion 3*a* obliquely toward the free, slightly tapering end 3*c* of the front portion 3*a*. The shape of the cross-section of the duct 3*b* corresponds to the shape of the locking member which may be a spherical member 2, a polygonal member 2*a* or the like. The configuration as a polygonal member in an also polygonal duct is particularly advantageous for larger tools and greater work pressures. FIG. 2 shows such a member 2*a*. The polygonal locking member 2*a* has the additional advantage that the rear side 2*a'* of the member 2*a* extends parallel and contacts the stop shoulder 1*c* of the drive surface 1*b*.

In accordance with another important feature of the invention, the chucking force P is transmitted from the clamping screw 4 through the tool shaft 1*a* to the locking member 2 or 2*a* by means of pressure piece 5 in the form of a loosely inserted, cylindrical intermediate member. To make possible a supply of cooling agent, the pressure piece 5, as well as the clamping screw 4, 4*b* and the tool shaft 1*a* can be tubular or provided with an internal bore 6.

The chuck according to the present invention makes it possible for the first time to construct the front portion 3*a* of the chuck with a diameter d which is significantly smaller than the diameter D of the chuck sleeve 3 and in which, depending on the type of application, the front portion 3*a* of the chuck can have any chosen length L without causing vibrations or the like on the tool. This is because the rod-shaped or tubular pressure piece 5 which is clamped into the chuck has a stabilizing effect on the entire chucking sleeve 3.

Among other advantages provided by the chuck according to the present invention shown in FIGS. 1 and 2 are the following:

a) Because of its slender construction, the chuck of the invention permits the use of normal tools where otherwise extremely long and, thus, expensive special tools would have to be used;

b) it is possible to use solid cross-section hard metal tools for working on deep drillings and drillings near edges while obtaining excellent times per piece, which also results in significant savings because expensive special tools are not required;

c) the chucking system is suitable for all tools which have a chucking or drive surface or similar surface; and d) the combined chucking arrangement stabilizes the tool and additionally makes possible an internal cooling agent supply.

While specific embodiments of the invention have been shown and described in detail to illustrate the inventive principles, it will be understood that the invention may be embodied otherwise without departing from such principles.

We claim:

1. A chuck for chucking predominantly chip-removing tools which have a cylindrical shaft and a recessed drive surface on he shaft with stop shoulders in axial direction, the chuck comprising an elongated sleeve having a front portion, the elongated sleeve defining a concentrically extending longitudinal bore, means for applying a chucking force on the tool shaft essentially in axial direction and a locking member for transmitting the chucking force between the tool shaft and the front portion of the chuck, the front portion of he chuck defining a radially outwardly open duct for receiving the locking member, the means for applying the chucking force on the tool shaft being a clamping screw inserted in the sleeve remote from the front portion of the chuck, a pressure piece placed loosely in the longitudinal bore between the clamping screw and the tool shaft, wherein the duct in the front portion of the chuck which receives the locking member extends from an outer surface of the front portion obliquely toward a free end of the front portion, and wherein the locking member and the duct have corresponding cross-sectional shapes.

2. The chuck according to claim 1, wherein the clamping screw, the pressure piece and the tool shaft each have an internal longitudinal bore for supplying cooling agent.

3. The chuck according to claim 1, wherein the locking member is a spherical member.

4. The chuck according to claim 1, wherein the locking member is a polygonal member.

5. The chuck according to claim 1, wherein the locking member has a plane rear side which extends parallel to the stop shoulder of the stop surface.

6. The chuck according to claim 1, wherein the front portion of the chuck has a smaller diameter than the elongated sleeve portion of the chuck.

* * * * *